(12) United States Patent
Lee et al.

(10) Patent No.: US 8,669,964 B2
(45) Date of Patent: Mar. 11, 2014

(54) PIEZORESISTIVE DEVICE, METHOD OF MANUFACTURING THE SAME AND PIEZORESISTIVE-TYPE TOUCH PANEL HAVING THE SAME

(75) Inventors: Seung Seob Lee, Daejeon (KR); Kang Won Lee, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 191 days.

(21) Appl. No.: 13/176,184

(22) Filed: Jul. 5, 2011

(65) Prior Publication Data

US 2012/0001870 A1   Jan. 5, 2012

(30) Foreign Application Priority Data

Jul. 5, 2010   (KR) .................. 10-2010-0064210

(51) Int. Cl.
*G06F 3/045* (2006.01)
*B05D 3/06* (2006.01)
*B05D 5/12* (2006.01)

(52) U.S. Cl.
USPC ......................... 345/174; 345/173; 427/100

(58) Field of Classification Search
CPC ............... G06F 3/045; G06F 3/0414
USPC .............. 345/173, 174, 60; 359/296
See application file for complete search history.

(56) References Cited

U.S. PATENT DOCUMENTS

| | | | | |
|---|---|---|---|---|
| 7,715,088 B2* | 5/2010 | Liang et al. | ................... | 359/296 |
| 2007/0109230 A1* | 5/2007 | Kang | ............................ | 345/74.1 |
| 2010/0001972 A1* | 1/2010 | Jiang et al. | ..................... | 345/173 |
| 2010/0108409 A1* | 5/2010 | Tanaka et al. | .............. | 178/18.06 |
| 2010/0141411 A1* | 6/2010 | Ahn et al. | ................... | 340/407.2 |
| 2010/0149076 A1* | 6/2010 | Yoo | ................................ | 345/60 |

FOREIGN PATENT DOCUMENTS

| | | | |
|---|---|---|---|
| KR | 10-2010-0021237 A | | 2/2010 |
| KR | 10-2010-0058083 A | | 6/2010 |

OTHER PUBLICATIONS

English Language Abstract of KR 10-2010-0021237 A.
English Language Abstract of KR 10-2010-0058083 A.
Office Action in Korean Application 10-2010-0064210 mailed on Jun. 29, 2011.

* cited by examiner

*Primary Examiner* — Andrew Sasinowski
(74) *Attorney, Agent, or Firm* — Rabin & Berdo, P.C.

(57) ABSTRACT

A method of manufacturing a piezoresistive device includes the steps of: producing a polymer structure with an elastically deformable upper surface by processing a polymer material; applying a carbon nanotube solution on the upper surface of the polymer structure in conformity with a predetermined pattern; and drying the carbon nanotube solution to form a carbon nanotube pattern on the upper surface of the polymer structure. A piezoresistive device manufactured by the above method and a piezoresistive-type touch panel provided with the piezoresistive device are also provided.

13 Claims, 4 Drawing Sheets

PIEZORESISTIVE DEVICE, METHOD OF MANUFACTURING THE SAME AND PIEZORESISTIVE-TYPE TOUCH PANEL HAVING THE SAME

CROSS-REFERENCE TO RELATED PATENT APPLICATION

This application claims the benefit under 35 U.S.C. §119 to Korean Patent Application No. 10-2010-0064210, filed on Jul. 5, 2010, in the Korean Intellectual Property Office, the disclosure of which is incorporated herein in its entirety by reference.

BACKGROUND OF THE INVENTION

1. Field of the Invention

The present invention relates to a touch panel and, more particularly, to a piezoresistive device for generating a signal using the piezoresistive property of a carbon nanotube, a method of manufacturing the piezoresistive device and a piezoresistive-type touch panel having the piezoresistive device.

2. Background Art

A touch panel is an input device used in electronic devices such as computers, personal digital assistants and various kinds of office equipment. The touch panel enables a user to input signals by a touch using a finger or a stylus without having to use an intermediate input device such as a keyboard or a mouse.

Depending on the configuration method, the touch panel is divided into a resistive touch panel, a capacitive touch panel, a surface acoustic wave (SAW) touch panel, an infrared touch panel, and so forth.

The resistive touch panel is composed of two overlapping substrates coated with transparent electrodes. If upper and lower electrode layers are brought into contact with each other by the pressure applied with a finger or a stylus, an electric signal is generated to indicate a touch position. The resistive touch panel is inexpensive, highly accurate and advantageous in size reduction. However, a difficulty is encountered in manufacturing a strong enough resistive touch panel because a touch is recognized only when two substrates make physical contact with each other.

The capacitive touch panel is driven by static electricity generated in a human body. The capacitive touch panel is highly durable, short in response time and superior in transmissibility. However, the capacitive touch panel is quite expensive and cannot be operated with a stylus or a gloved hand.

The surface acoustic wave touch panel is designed to detect a decrease in the amplitude of ultrasonic waves when the ultrasonic waves meet an obstacle. The surface acoustic wave touch panel is superior in light transmittance but vulnerable to contamination and liquid attack.

The infrared touch panel makes use of the property of infrared rays which are invisible to the human eyes and are interrupted by an obstacle due to their tendency to go straight. The infrared touch panel includes light emitting elements and light receiving elements, both of which are arranged in a mutually opposing relationship. The infrared touch panel recognizes the coordinates where the infrared rays are interrupted by a touch. The infrared touch panel does not require the use of an ITO film and can be configured by a single sheet of glass, thus exhibiting superior transmittance.

Among the various kinds of touch panels mentioned above, the resistive touch panel and the capacitive touch panel are extensively used in recent years. However, the resistive touch panel suffers from a problem in that the electrodes thereof may be destroyed by a touch. The capacitive touch panel poses a problem in that it cannot be operated with a non-human-body tool.

DETAILED DESCRIPTION OF THE INVENTION

Technical Problems

In view of the situations noted above, it is an object of the present invention to provide a piezoresistive device using the piezoresistive property of carbon nanotubes, which can reduce the likelihood of breakage of electrodes and can be operated with a non-human-body tool, a method of manufacturing the piezoresistive device and a piezoresistive-type touch panel having the piezoresistive device.

Solution to the Technical Problems

In a first aspect of the present invention, there is provided a method of manufacturing a piezoresistive device, including the steps of: (a) producing a polymer structure with an elastically deformable upper surface by processing a polymer material; (b) applying a carbon nanotube solution on the upper surface of the polymer structure in conformity with a predetermined pattern; and (c) drying the carbon nanotube solution to form a carbon nanotube pattern on the upper surface of the polymer structure.

The step (a) may include forming a pattern groove on the upper surface of the polymer structure, the carbon nanotube solution being applied on the pattern groove in the step (b).

The step (a) may include forming an escape groove on a lower surface of the polymer structure to provide a space into which an upper portion of the polymer structure can be sagged.

The polymer material may be an ultraviolet-curable resin, the polymer structure being produced by pressing the ultraviolet-curable resin while irradiating ultraviolet rays on the ultraviolet-curable resin in the step (a).

The polymer material may be a thermoplastic resin, the polymer structure being produced by pressing the thermoplastic resin while applying heat to the thermoplastic resin in the step (a).

The step (a) may include pressing the polymer material by a contact printing method using a mold.

The step (a) may include pressing the polymer material by a roll-to-roll printing method using a roll.

The step (b) may include applying the carbon nanotube solution on the upper surface of the polymer structure by an inkjet printing method.

The step (b) may include applying the carbon nanotube solution on the upper surface of the polymer structure by a contact printing method using a mold.

The step (b) may include applying the carbon nanotube solution on the upper surface of the polymer structure by a roll-to-roll printing method using a roll.

In a second aspect of the present invention, there is provided a piezoresistive device manufactured by the method of the first aspect.

In a third aspect of the present invention, there is provided a piezoresistive-type touch panel, including: a piezoresistive device including a polymer structure with an elastically deformable upper surface and a carbon nanotube pattern formed on the upper surface of the polymer structure, the carbon nanotube pattern being deformable to exhibit a change in resistance value when the upper surface of the polymer structure is deformed by an external force; and a protection plate arranged to cover the upper surface of the polymer structure.

The polymer structure may include a pattern groove defined on the upper surface thereof, the carbon nanotube pattern being arranged in the pattern groove, the polymer structure including a lower surface and an escape groove defined on the lower surface to provide a space into which an upper portion of the polymer structure can be sagged.

Advantageous Effects

The piezoresistive device according to the present invention makes use of a carbon nanotube pattern. Thus, the piezoresistive device can reduce the likelihood of breakage of electrodes as compared with the conventional resistive touch panel. Unlike the conventional capacitive touch panel, the piezoresistive device can be operated with a non-human-body tool.

In the piezoresistive device according to the present invention, the resistance value is changed in proportion to the pressure applied Thanks to this feature, the piezoresistive device can be used as a multi-functional sensor in many different fields including a touch panel.

In the piezoresistive device according to the present invention, the polymer structure and the carbon nanotube pattern are all pliable and flexible. Therefore, the piezoresistive device can be attached to a curved surface and can be used in a bent component.

The piezoresistive device according to the present invention is manufactured by an embossing method and a printing method. This makes it possible to solve the problem of environmental contamination caused by waste materials in the conventional photolithography semiconductor manufacturing process or in the conventional micro-electromechanical system (MEMS) process, and to manufacture a piezoresistive device with an increased surface area in a cost-effective manner.

BEST MODE FOR CARRYING OUT THE INVENTION

Figure 1:
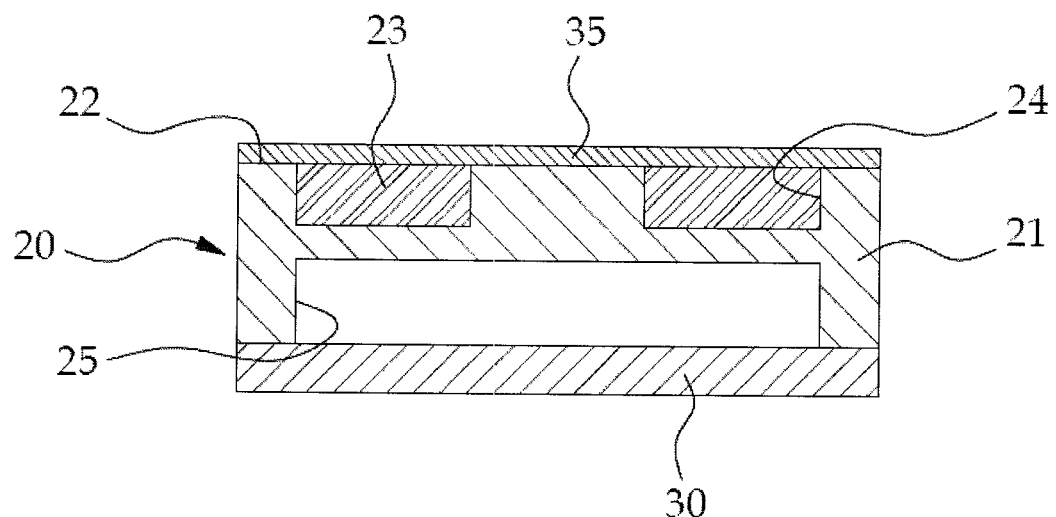
FIG. 1 shows a piezoresistive-type touch panel having a piezoresistive device in accordance with one embodiment of the present invention.

Certain embodiments of a piezoresistive device, a method of manufacturing the same and a piezoresistive-type touch panel having the same will now be described with reference to the accompanying drawings.

In describing the present invention, the size and shape of components will sometimes be exaggerated or simplified in the drawings for clarity or convenience in description. The terms specifically defined herein are intended to merely describe the configuration and operation of the present invention and shall be construed in light of the present disclosure as a whole and in conformity with the technical concept of the present invention.

Figure 2:
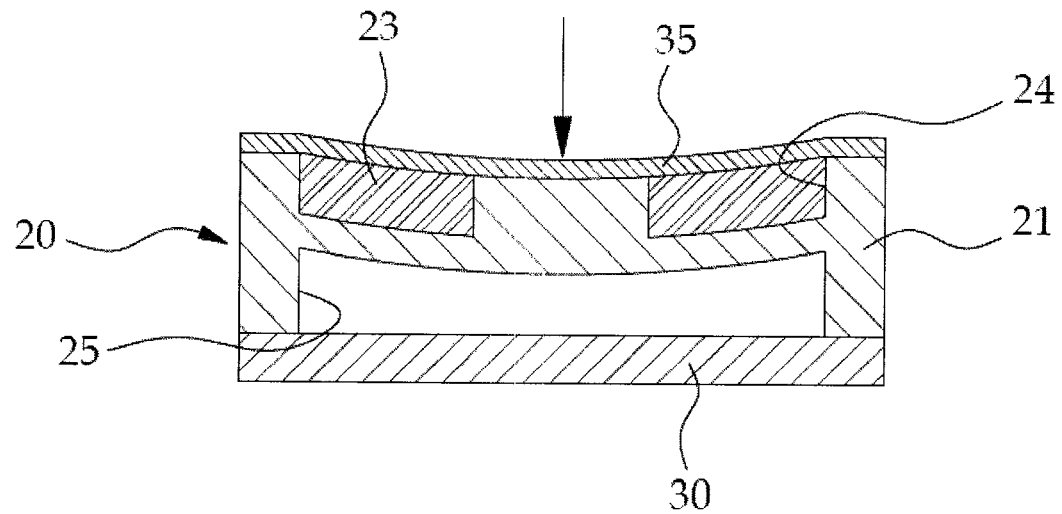
FIG. 2 is a view for explaining the operation of the piezoresistive-type touch panel having a piezoresistive device in accordance with one embodiment of the present invention.

Referring to FIGS. 1 and 2, there is shown a piezoresistive-type touch panel in accordance with one embodiment of the present invention.

As shown in FIG. 1, the piezoresistive-type touch panel 10 includes a piezoresistive device 20, a substrate 30 arranged to support the piezoresistive device 20 and a protection plate 35 arranged to cover the upper surface of the piezoresistive device 20. The protection plate 35 is made of a variety of elastically deformable materials.

The piezoresistive device 20 includes a polymer structure 21 with an elastically deformable upper surface 22 and a carbon nanotube pattern 23 provided on the upper surface 22 of the polymer structure 21. On the upper surface 22 of the polymer structure 21, there is provided a pattern groove 24 in which the carbon nanotube pattern 23 is arranged. An escape groove 25 is provided on the lower surface of the polymer structure 21. The escape groove 25 provides a space into which the upper portion of the polymer structure 21 can move when the polymer structure 21 is sagged by an external force applied to the upper surface 22.

The touch panel 10 is designed to utilize a change in the resistance value of the carbon nanotube pattern 23. The carbon nanotube pattern 23 serves as a piezoresistive body. The piezoresistive body has a property with which a resistance value as an electric signal is changed depending on the mechanical deformation of the piezoresistive body. Carbon nanotubes making up the carbon nanotube pattern 23 are one of carbon allotropes. Each of the carbon nanotubes has an extremely small diameter of nanometer level and exhibits superior conductivity and strength. Accordingly, the carbon nanotubes are suitable for use as pliable electric elements that can be deformed together with the polymer structure 21.

If the polymer structure 21 is deformed by an external force applied to the upper surface 22 as shown in FIG. 2, the carbon nanotube pattern 23 undergoes deformation, in response to which the resistance value of the carbon nanotube pattern 23 is changed. The resistance value of the carbon nanotube pattern 23 is increased in proportion to the external force applied to the carbon nanotube pattern 23 and is returned to an original resistance value upon removing the external force. Sagging is generated in the carbon nanotube pattern 23 in proportion to the pressure applied to the carbon nanotube pattern 23. The resistance value of the carbon nanotube pattern 23 is increased in proportion to the pressure applied to the carbon nanotube pattern 23.

In the piezoresistive-type touch panel 10, the resistance value at the same point varies with the pressing force. Therefore, the touch panel 10 can be applied to a touch screen for the input of information and can also be used as a multi-functional touch sensor that enables a single button to perform multiple functions.

A process of manufacturing the piezoresistive device 20 will now be described with reference to FIGS. 3A through 3D.

Figure 3A:
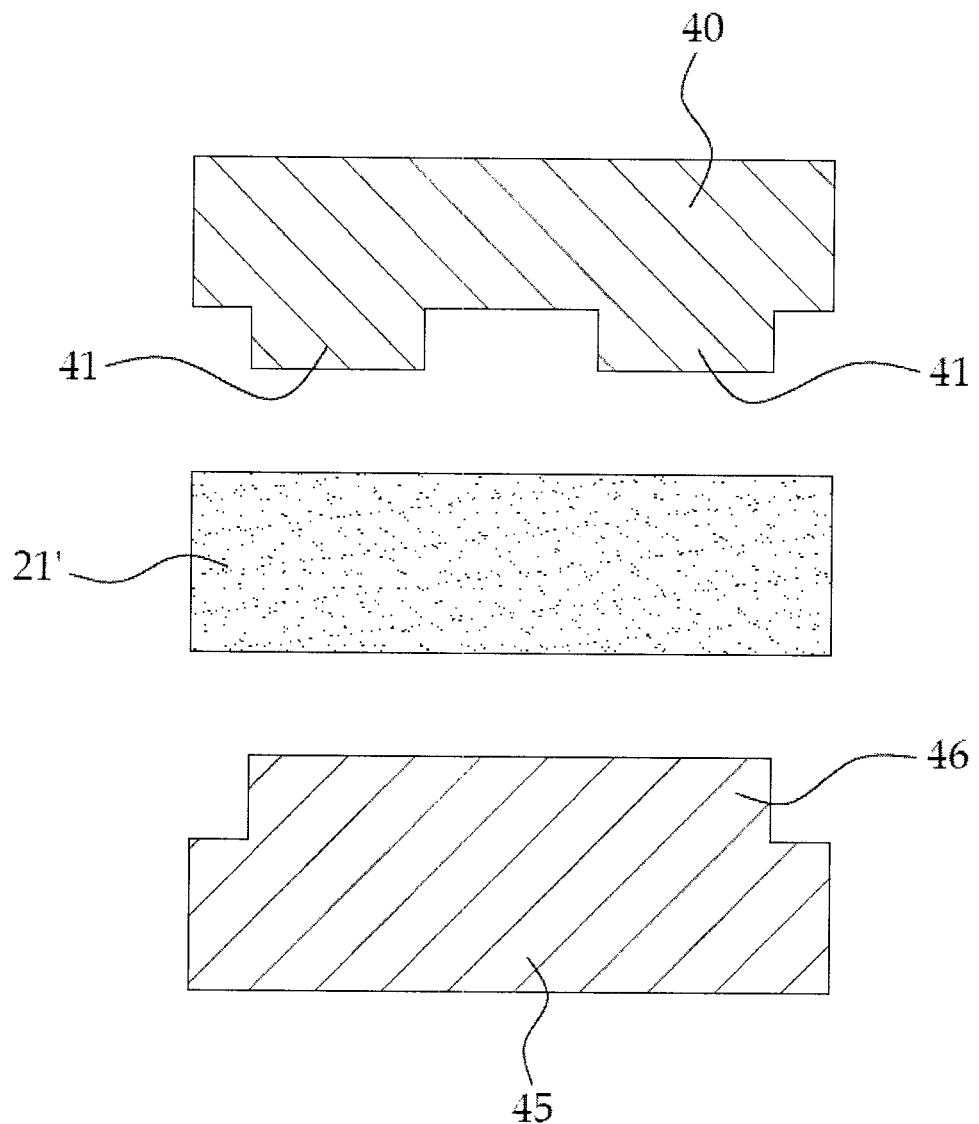
FIGS. 3A through 3D illustrate a series of steps for manufacturing the piezoresistive device in accordance with one embodiment of the present invention.
Figure 3B:
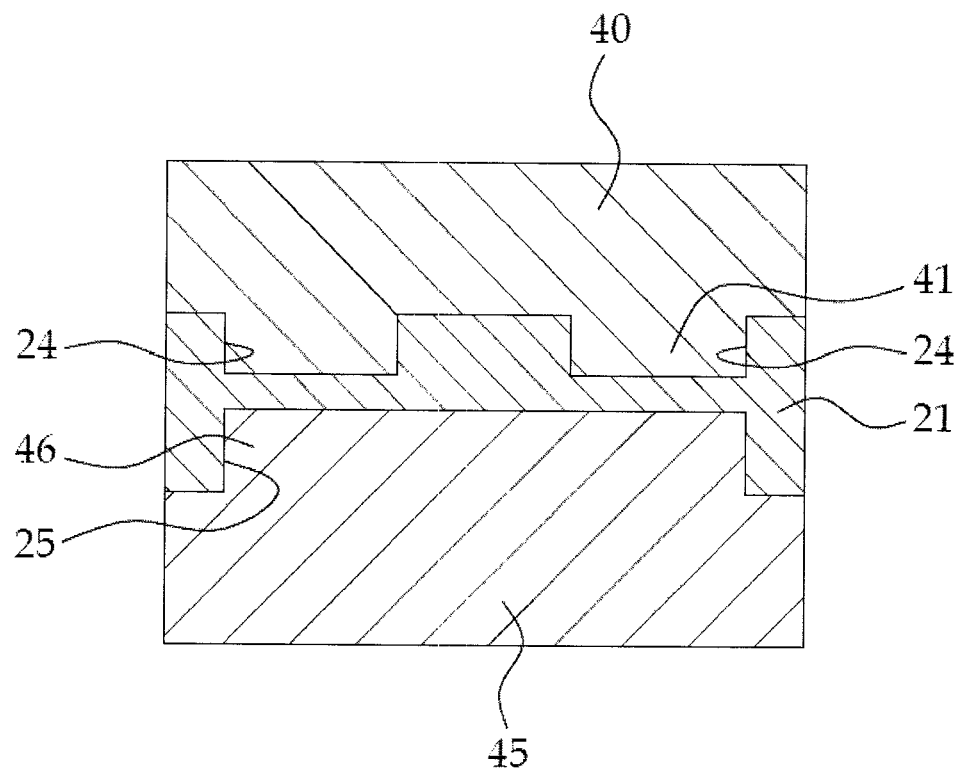

As shown in FIGS. 3A and 3B, a polymer material 21', an upper mold 40 and a lower mold 45 are prepared. The polymer material 21' is embossed to manufacture a polymer structure 21 having an elastically deformable upper surface 22. A material elastically deformable when applied with an external force, e.g., an ultraviolet-curable resin or a thermoplastic resin, is used as the polymer material 21'.

In case of using an ultraviolet-curable resin as the polymer material 21', the polymer structure 21 is manufactured by an ultraviolet embossing method. In case of using a thermoplastic resin as the polymer material 21', the polymer structure 21 is manufactured by a hot embossing method. In the ultraviolet embossing method, as shown in FIG. 3B, ultraviolet rays are irradiated on the polymer material 21' while pressing the polymer material 21' with the upper mold 40 and the lower mold 45. Thus, the polymer material 21' is compressed and cured into a polymer structure 21. In the hot embossing method, as shown in FIG. 3B, the polymer material 21' is heated and compressed by the upper mold 40 and the lower mold 45. Thus, the polymer material 21' is deformed into a polymer structure 21 of desired shape.

As can be seen in FIG. 3B, the polymer material 21' is deformed into a shape conforming to the shapes of the upper mold 40 and the lower mold 45 as the polymer material 21' is pressed by the upper mold 40 and the lower mold 45. When the polymer material 21' is pressed by the upper mold 40 and the lower mold 45, a pattern groove 24 is formed on the upper surface 22 of the polymer structure 21 by a protrusion 41 of the upper mold 40. An escape groove 25 is formed on the lower surface of the polymer structure 21 by a protrusion 46 of the lower mold 45.

In order to form the polymer structure 21 from the polymer material 21', it is possible to use not only a contact printing method in which the upper mold 40 and the lower mold 45 are employed as shown in the drawings but also a roll-to-roll printing method in which rolls are employed. In the roll-to-roll printing method, the polymer material 21' is moved through between a pair of rotating rolls to produce a polymer structure of desired shape.

Figure 3C:
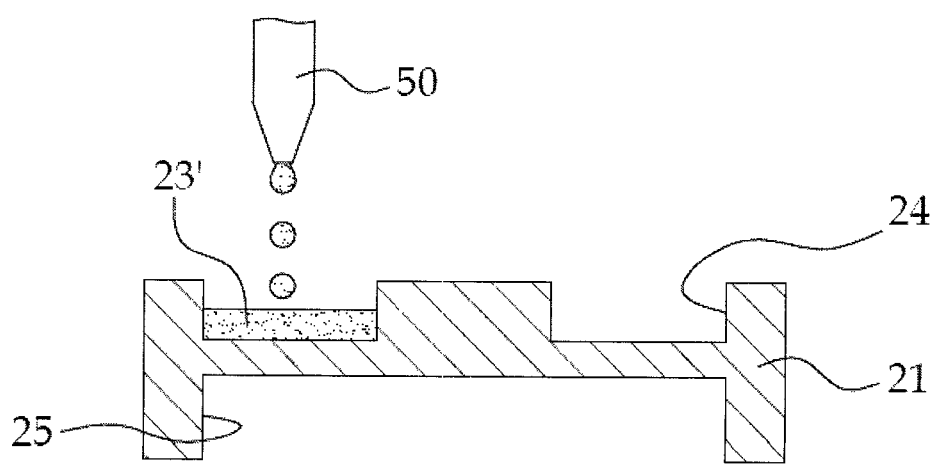

After producing the polymer structure 21 in the embossing method, a carbon nanotube solution 23' is applied on the pattern groove 24 of the polymer structure 21 as shown in FIG. 3C. The carbon nanotube solution 23' is prepared by dispersing carbon nanotubes in a dispersion solution.

The carbon nanotube solution 23' can be applied on the pattern groove 24 by an inkjet printing method using a printing device 50 as shown in FIG. 3C, a contact printing method using a mold or a roll-to-roll printing method using a roll. In the contact printing method, a mold is dipped into the carbon nanotube solution 23' and then the carbon nanotube solution 23' adhering to the mold is transferred to the polymer structure 21. In the roll-to-roll printing method, a roll is dipped into the carbon nanotube solution 23' and then the carbon nanotube solution 23' adhering to the mold is transferred to the polymer structure 21.

Figure 3D:
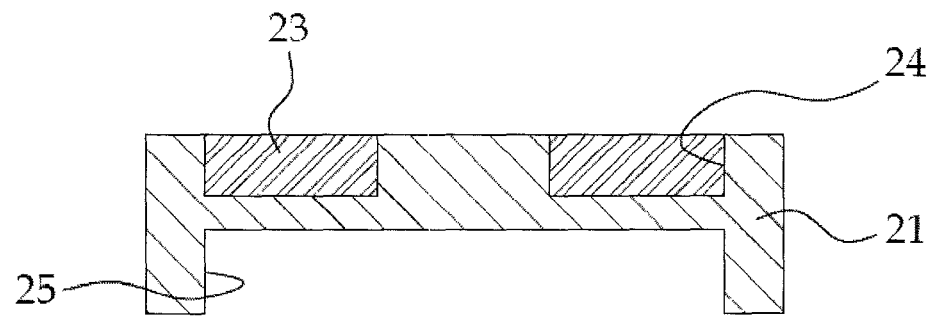

After applying the carbon nanotube solution 23' on the polymer structure 21, the carbon nanotube solution 23' is dried as shown in FIG. 3D, thereby forming a carbon nanotube pattern 23 on the upper surface of the polymer structure 21.

The steps of supplying the polymer material 21', embossing the polymer material 21', applying the carbon nanotube solution 23' and drying the carbon nanotube solution 23' can be performed one after another on a conveying device such as a belt conveyor.

Figure 4:
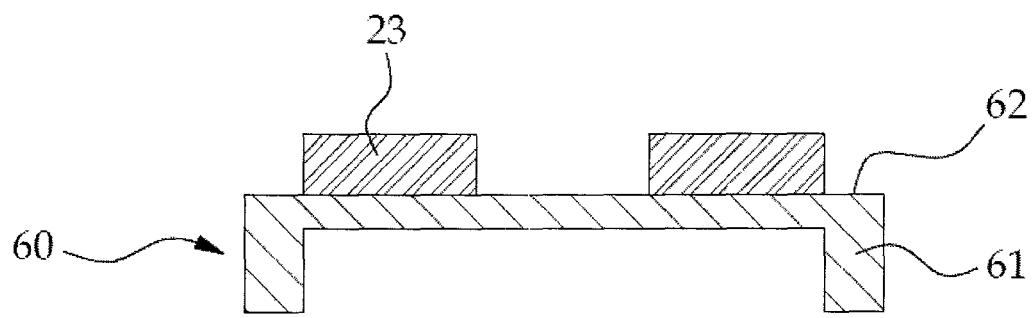
FIG. 4 shows a piezoresistive device in accordance with another embodiment of the present invention.
Figure 5:
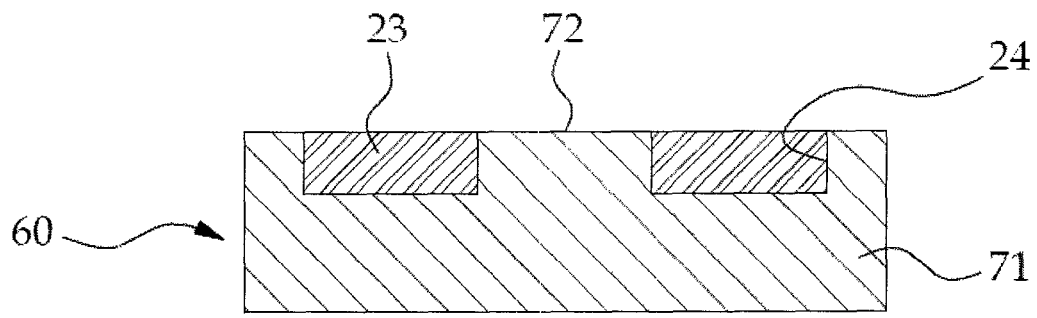
FIG. 5 shows a piezoresistive device in accordance with a further embodiment of the present invention.

Other embodiments of the piezoresistive device of the present invention are shown in FIGS. 4 and 5.

A piezoresistive device 60 shown in FIG. 4 includes a polymer structure 61 with no pattern groove and a carbon nanotube pattern 23 formed on the upper surface 62 of the polymer structure 61. In this piezoresistive device 60, the carbon nanotube pattern 23 is deformed as the polymer structure 61 is sagged by an external force applied to the upper surface 62. As a result, the resistance value of the carbon nanotube pattern 23 is changed.

A piezoresistive device 70 shown in FIG. 5 includes a polymer structure 71 with no escape groove and a carbon nanotube pattern 23 formed in the pattern groove 73 of the polymer structure 71. In the piezoresistive device 70, the polymer structure 71 is made of an elastically deformable polymer. Thus, the upper surface 72 of the polymer structure 71 is sagged downwards when an external force is applied to the upper surface 72. At this time, the carbon nanotube pattern 23 provided in the pattern groove 73 of the polymer structure 71 is deformed. As a result, the resistance value of the carbon nanotube pattern 23 is changed.

In addition to the foregoing embodiments, the piezoresistive device of the present invention may be modified in many different structures having a carbon nanotube pattern formed on the upper surface of the polymer structure in an embossing method or a printing method.

As described above, the piezoresistive device according to the present invention makes use of a carbon nanotube pattern. Thanks to this feature, the piezoresistive device can reduce the likelihood of breakage of electrodes as compared with the conventional resistive touch panel. Unlike the conventional capacitive touch panel, the piezoresistive device can be operated with a non-human-body tool.

While certain preferred embodiments of the present invention have been described hereinabove, the present invention shall not be limited thereto. It will be apparent to those skilled in the art that various changes and modifications may be made without departing from the scope of the invention defined in the claims.

What is claimed is:

1. A method of manufacturing a piezoresistive device which generates a signal using a piezoresistive property of carbon nanotubes, the method comprising the steps of:
    (a) producing a polymer structure by pressing a polymer material, said producing the polymer structure including
        (a-1) preparing an upper mold having one or more first protrusions on a lower surface thereof,
        (a-2) preparing a lower mold having a second protrusion on an upper surface thereof, the second protrusion not being formed on a peripheral portion of the upper surface, the second protrusion having a predetermined height in a vertical direction compared to the peripheral portion of the upper surface, and
        (a-3) forming one or more pattern grooves in an upper surface of the polymer material by pressing the upper mold against the upper surface of the polymer material, and forming an escape groove in a lower surface of the polymer material by pressing the lower mold against the lower surface of the polymer material, wherein the escape groove is not formed in a peripheral portion of the lower surface of the polymer material but is depressed inwardly from the peripheral portion of the lower surface of the polymer material, forming a flange defined collectively by the peripheral portion of the lower surface and a side of the escape groove,
    (b) applying a carbon nanotube solution inside each of the pattern grooves of the polymer structure; and
    (c) drying the carbon nanotube solution to form a carbon nanotube pattern inside each of the pattern grooves of the polymer structure.

2. The method as recited in claim 1, wherein the polymer material is an ultraviolet-curable resin, the polymer structure being produced by pressing the ultraviolet-curable resin while irradiating ultraviolet rays on the ultraviolet-curable resin in the step (a).

3. A piezoresistive device manufactured by the method of claim 2.

4. The method as recited in claim 1, wherein the polymer material is a thermoplastic resin, the polymer structure being produced by pressing the thermoplastic resin while applying heat to the thermoplastic resin in the step (a).

5. A piezoresistive device manufactured by the method of claim 4.

6. The method as recited in claim 1, wherein the step of pressing the polymer material is conducted by a contact printing method using a mold.

7. A piezoresistive device manufactured by the method of claim 6.

8. The method as recited in claim 1, wherein the step of pressing the polymer material is conducted by a roll-to-roll printing method using a roll.

9. The method as recited in claim 1, wherein the step of applying the carbon nanotube solution is conducted by an inkjet printing method.

10. The method as recited in claim 1, wherein the step of applying the carbon nanotube solution is conducted by a contact printing method using a mold.

11. The method as recited in claim 1, wherein the step of applying the carbon nanotube solution is conducted by a roll-to-roll printing method using a roll.

12. A piezoresistive device manufactured by the method of claim 1.

13. A piezoresistive-type touch panel, comprising:
a piezoresistive device generating a signal using a piezoresistive property;
a substrate disposed under the piezoresistive device and supporting the piezoresistive device;
a protection plate arranged to cover the piezoresistive device,
the piezoresistive device including
    a polymer structure formed as one body and having
        an elastically deformable upper surface,
        one or more pattern grooves defined in the upper surface of the polymer structure, and
        an escape groove defined by the polymer structure in a lower surface of the polymer structure, the escape groove not being defined in a peripheral portion of the lower surface, the escape groove having a predetermined depth in a vertical direction compared to the peripheral portion,
    a carbon nanotube pattern formed inside each of the pattern grooves, the carbon nanotube pattern having the piezoresistive property causing a change in resistance value when the carbon nanotube pattern is deformed by an external force,
wherein the escape groove, the peripheral portion and the substrate form a blank space such that the blank space is free from any electrode or any spacer, and an upper portion of the polymer structure can be sagged when the polymer structure is deformed by the external force.

* * * * *